(12) United States Patent
Igolnik et al.

(10) Patent No.: US 11,153,325 B1
(45) Date of Patent: Oct. 19, 2021

(54) SERVER-BASED RESTRICTED ACCESS STORAGE

(71) Applicant: Splunk Inc., San Francisco, CA (US)

(72) Inventors: Leonid Igolnik, San Francisco, CA (US); Ramachandran Jothikumar, Saratoga, CA (US); Karthik Rau, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/893,191

(22) Filed: Jun. 4, 2020

Related U.S. Application Data

(60) Provisional application No. 63/018,208, filed on Apr. 30, 2020.

(51) Int. Cl.
| | |
|---|---|
| *G06F 15/16* | (2006.01) |
| *H04L 29/06* | (2006.01) |
| *H04L 29/08* | (2006.01) |
| *G06F 8/60* | (2018.01) |

(52) U.S. Cl.
CPC ............. *H04L 63/102* (2013.01); *G06F 8/60* (2013.01); *H04L 63/0815* (2013.01); *H04L 67/1002* (2013.01); *H04L 67/1095* (2013.01)

(58) Field of Classification Search
CPC ............. H04L 63/102; H04L 63/0815; H04L 67/1002; H04L 67/1095
USPC ......................................................... 709/200
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 8,880,678 B1 * | 11/2014 | Colton ................. | G06F 9/5072 709/224 |
| 9,215,240 B2 | 12/2015 | Merza et al. | |
| 9,286,413 B1 | 3/2016 | Coates et al. | |
| 10,127,258 B2 | 11/2018 | Lamas et al. | |

(Continued)

OTHER PUBLICATIONS

Splunk Enterprise 8.0.0 Overview, available online, retrieved May 20, 2020 from docs.splunk.com.

(Continued)

*Primary Examiner* — Moustafa M Meky
(74) *Attorney, Agent, or Firm* — McDermott Will & Emery LLP

(57) ABSTRACT

According to embodiments, a method for distributing a service through server-based restricted access storage includes executing, by a service provider, a service deployment of the service to a client in a cloud environment that operates client software in addition to the service deployment, the cloud environment provided by the client, the service deployment provided by the service provider and separate from the client software executing in the cloud environment. The method also includes receiving, by the service provider, privileges from the client to allow the service provider to access and operate the service in the cloud environment, the privileges providing access to the cloud environment separate from the client software executing in the cloud environment. The method also includes configuring the service deployment to monitor the client software, wherein the service deployment is partially isolated from other portions of the cloud environment.

20 Claims, 12 Drawing Sheets

(56) References Cited

U.S. PATENT DOCUMENTS

| | | | |
|---|---|---|---|
| 10,171,565 B2* | 1/2019 | Moon | H04L 43/08 |
| 10,749,939 B2* | 8/2020 | Moon | G06F 11/302 |
| 2015/0228003 A1* | 8/2015 | Iyoob | H04L 67/16 |
| | | | 705/26.64 |
| 2018/0077224 A1* | 3/2018 | Moon | G06F 11/302 |
| 2019/0098076 A1* | 3/2019 | Moon | H04L 43/08 |
| 2019/0098106 A1 | 3/2019 | Mungel et al. | |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

* cited by examiner

| 402 | Timestamp | 11:23:07AM 12/10/2019 | } Dimension (Metric) |
|---|---|---|---|
| 404 | Value | 23 | |
| 406 | Metric | Num Transactions | } Dimension (Metric) |
| 408 | Customer | Acme | } Dimension |
| 410 | Service | Checkout | } Dimension |
| 412 | Host | host9 | } Dimension |

400

MTS 420

FIG. 4

SERVER-BASED RESTRICTED ACCESS STORAGE

CROSS REFERENCE TO RELATED APPLICATIONS

This application claims benefit under 35 U.S.C. § 119(e) of U.S. Provisional Application Ser. No. 63/018,208 filed Apr. 30, 2020, the entire contents of which are hereby incorporated by reference.

TECHNICAL FIELD

The present disclosure generally relates to cloud computing, and more particularly to deploying a software as a service (SaaS) through server-based restricted access storage.

BACKGROUND

Cloud computing provides users access to on-demand computer system resources, such as data storage and computing power, without direct active management by the users. It is a powerful tool that has allowed software providers to efficiently and effectively distribute software services to end users. Software as a service (SaaS) is an example of cloud computing where a software provider's applications are accessible to users as on-demand software through a web browser or a program interface.

BRIEF SUMMARY

Embodiments of the present disclosure provide for a cloud environment is configured to allow a third party (e.g., a SaaS provider) to access and operate a SaaS deployment in a cloud environment that also operates other software. The SaaS deployment and the SaaS provider's access to the cloud environment are separate from the other software running in the cloud environment. The SaaS also monitors the other software, such that there is partial isolation of the SaaS deployment portion from the rest of the cloud environment.

According to embodiments of the present disclosure, a computer-implemented method for distributing a service through server-based restricted access storage is provided. The method includes executing, by a service provider, a service deployment of the service to a client in a cloud environment that operates client software in addition to the service deployment, the cloud environment provided by the client, the service deployment provided by the service provider and separate from the client software executing in the cloud environment. The method also includes receiving, by the service provider, privileges from the client to allow the service provider to access and operate the service in the cloud environment, the privileges providing access to the cloud environment separate from the client software executing in the cloud environment. The method also includes configuring the service deployment to monitor the client software, wherein the service deployment is partially isolated from other portions of the cloud environment.

According to one embodiment of the present disclosure, a system for distributing a service is provided. The system may include at least one memory having instructions stored thereon. The system may also include at least one processor configured to execute the instructions, wherein at least one processor is configured to execute, by a service provider, a service deployment of the service to a client in a cloud environment that operates client software in addition to the service deployment, the cloud environment provided by the client, the service deployment provided by the service provider and separate from the client software executing in the cloud environment. The processor may further be configured to receive, by the service provider, privileges from the client to allow the service provider to access and operate the service in the cloud environment, the privileges providing access to the cloud environment separate from the client software executing in the cloud environment. The processor may further be configured to configure the service deployment to monitor the client software, wherein the service deployment is partially isolated from other portions of the cloud environment.

According to one embodiment of the present disclosure, non-transitory computer-readable storage medium comprising instructions stored thereon, which when executed by one or more processors, cause the one or more processors to perform operations for distributing a service. The operations may include executing, by a service provider, a service deployment of the service to a client in a cloud environment that operates client software in addition to the service deployment, the cloud environment provided by the client, the service deployment provided by the service provider and separate from the client software executing in the cloud environment. The operations may also include receiving, by the service provider, privileges from the client to allow the service provider to access and operate the service in the cloud environment, the privileges providing access to the cloud environment separate from the client software executing in the cloud environment. The operations may also include configuring the service deployment to monitor the client software, wherein the service deployment is partially isolated from other portions of the cloud environment.

According to one embodiment of the present disclosure, a system is provided that includes means for storing instructions, and means for executing the stored instructions which, when executed by the means, causes the means to perform a method for distributing a service. The method includes executing, by a service provider, a service deployment of the service to a client in a cloud environment that operates client software in addition to the service deployment, the cloud environment provided by the client, the service deployment provided by the service provider and separate from the client software executing in the cloud environment. The method also includes receiving, by the service provider, privileges from the client to allow the service provider to access and operate the service in the cloud environment, the privileges providing access to the cloud environment separate from the client software executing in the cloud environment. The method also includes configuring the service deployment to monitor the client software, wherein the service deployment is partially isolated from other portions of the cloud environment.

BRIEF DESCRIPTION OF THE DRAWINGS

The present disclosure is illustrated by way of example, and not limitation, in the figures of the accompanying drawings in which like reference numerals indicate similar elements and in which:

FIG. 4 shows an example data structure, according to an embodiment of the present disclosure;

DETAILED DESCRIPTION

Figure 1:
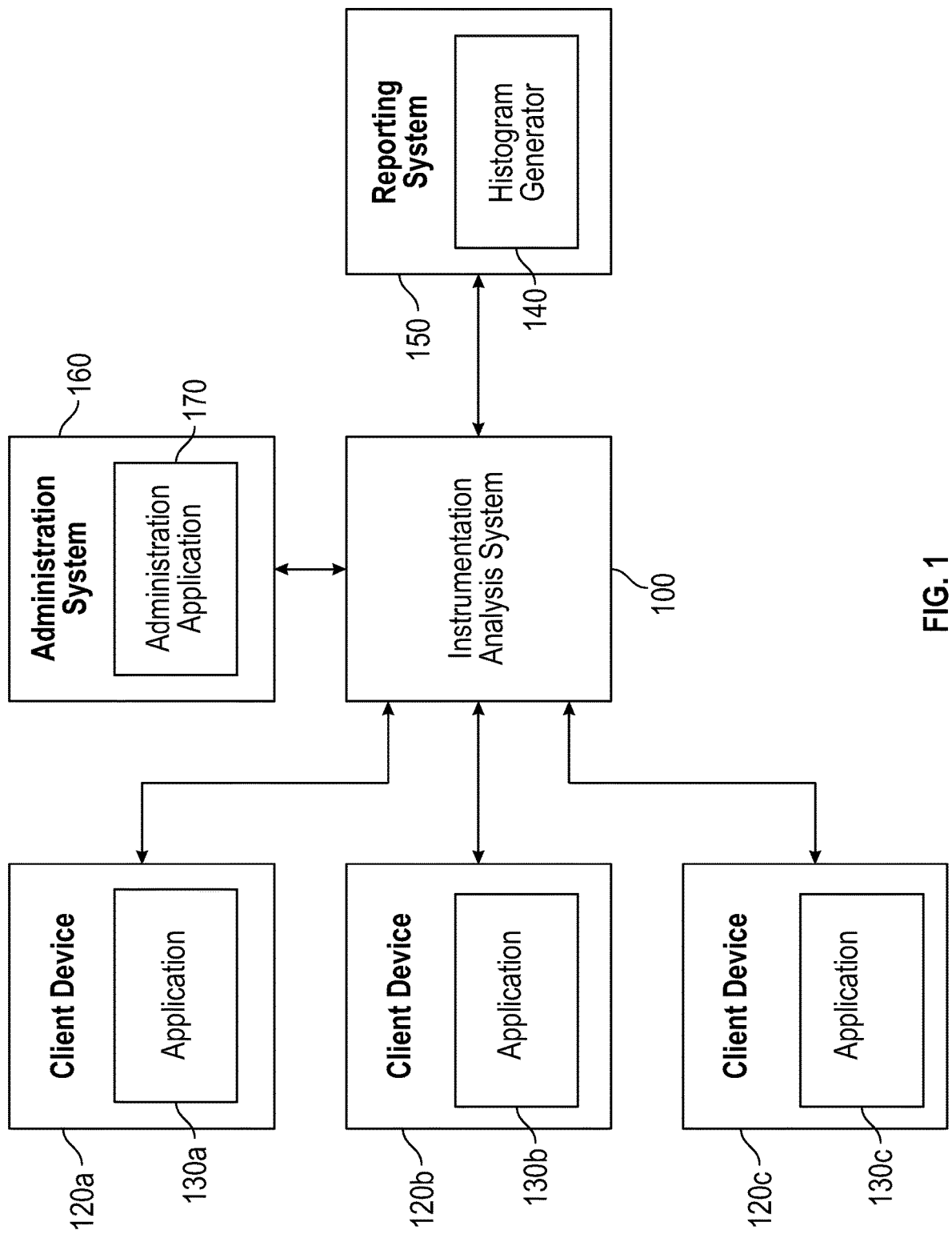
FIG. 1 shows an overall system environment for reporting based on instrumented software, according to an embodiment of the present disclosure.

Trace and Span Sampling and Analysis for Instrumented Software

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "trace" as used herein generally refers to a record of the manner in which a single user request, also referred to as a transaction, propagates from one microservice (hereinafter, interchangeably, referred to as "service") to the next in a distributed application. A transaction is generally described as an end-to-end, request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. A trace, in one embodiment, may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute to a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags). The annotations and attributes can describe and contextualize the work being done under a span.

The term "tags" as used herein generally refers to key:value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g. tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that execute on different services may have different values for the same tag, e.g. tag "region" may take different values in two services: a span in Service A may be attributed to "region:east" and a span in Service B may be attributed to "region:west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more metadata objects (also referred to herein as "dimensions") results in a metric data point. A single metric data point may include multiple measurements and multiple dimensions.

Metrics are used to track and assess the status of one or more processes. A metric typically comprises a numeric value that is stored as a timeseries.

Software developers monitor different aspects of software they develop by instrumenting the software. These aspects include performance of the software, disk utilization of the software, CPU utilization of the software, errors encountered during execution of the software, significant events encountered during execution of the software, information describing which parts of the code are being executed and which parts are not being executed, and so on. After development, similar aspects of the software are also monitored during production, for example, when software is being executed on a cloud architecture.

Conventional user environments are complicated because they include many micro transactions that are handled by a variety of hosts, containers, and infrastructure platforms. As a result, it is difficult to identify a root cause of an alert for a network problem, bad process, poor service, etc.

Computing operations can be described by spans and traces. A span may include an atomic computing operation performed in handling a request, and may include an operation name (e.g., "start"), a service (e.g., "analytics"), and start and end timestamps. Spans may be annotated with additional tags, such as key:value pairs, that provide further context regarding the execution environment. For example, a trace may include a set of spans traversed in the handling of a single request.

According to embodiments, each span and trace may have a duration equal to the difference between the start and end timestamps for the span, or for the group of spans forming the trace. Instrumented software may be instrumented to emit spans and traces. The spans and traces can be generated according to an industry standard, such as the OpenTracing standard. Each span may be annotated with one or more tags that provide context about the execution, such as the user instrumenting the software, a document involved in the request, an infrastructure element used in servicing a request, etc.

Communicating all of the spans and traces produced by a software application to an analysis system and storing these spans and traces imposes a serious infrastructure cost. Furthermore, it is unnecessary to transfer and store all emitted spans and traces, since code usually executes quickly and without errors. In prior implementations, traces emitted by a software application were randomly sampled and transmitted for analysis. However, certain types of traces provide more valuable information, and random sampling may not surface these traces. For example, if most traces are error-free, and only a few indicate errors, a random sampling scheme provides a large amount of uninteresting, error-free traces, and may miss the traces that indicate errors.

To obtain a sample of traces that includes a higher proportion of interesting traces, a gateway performs tail-based sampling of traces. The gateway resides at the instrumented software, receives all emitted spans and traces, and in real or near-real time, selects traces to transmit to an analysis system. For example, the gateway selects a portion of traces that include an interesting span (e.g., selecting for spans with long durations), a portion of traces that include a span with an error, and a portion of traces selected based on overall trace duration. The gateway may select spans and traces using a statistical model that references a reservoir of spans and traces. The gateway maintains in the reservoir a collection of duration values that describe the distributions of durations for recently received traces and recently received spans, and the span or trace distribution is used to calculate a score for each received span or trace. Each emitted trace has a chance of being selected, but the gateway favors selecting longer or unusual spans and traces. Each selected trace is associated with a weight indicating the likelihood that the trace is stored according to the statistical model.

The gateway may use a dynamic timeout mechanism to determine when a trace is complete. For example, the dynamic timeout mechanism may include both a fixed duration (e.g., 100 ms) and a variable duration that is calculated based on durations of other traces. If a trace reaches the larger of the fixed duration and the variable duration, it is considered complete and passed through the sampling mechanism in the gateway. The reservoir of recently received traces may be used to calculate the variable duration; for example, the variable duration may be five times the $99^{th}$ percentile duration for a trace or a curve based on duration. Both the fixed duration and the variable duration may be configurable. The dynamic timeout mechanism provides a balance between completeness/accuracy and timeliness. In addition, the dynamic timeout mechanism saves memory compared to using only a longer fixed duration, since in most cases, the sampling decision can be made sooner than if only a long fixed duration (e.g., 5 minutes) is used.

The analysis system receives the traces selected by the gateway and performs analysis on the selected traces. The analysis system may derive a distribution of all of the emitted spans and traces (not just the selected traces) based on the weights. The analysis system may receive traces, with their component spans and associated tags, from multiple instances of instrumented software.

In an embodiment, the analysis system compares durations of a set of similar spans (e.g., spans for the same type of request) with the tags associated with these spans and determines whether there are any patterns for a given tag. The analysis system generates a histogram that represents a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-values less than or equal to some threshold, e.g., 0.01.

In another embodiment, the analysis system uncovers patterns relating span tags to error spans, which are spans that cause an error or exception to be thrown. This can highlight possible explanations for errors and help users understand patterns among errors. For example, the analysis system can determine if error spans tend to come from a particular user (whose requests might be somehow malformed). To analyze errors, the analysis system computes, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analysis system may correct the p-value for the number of hypotheses tested, for example by multiplying the p-value by the total number of tags. This procedure defines a map from tags to non-negative real numbers. The analysis system sorts the tags by the associated p-value (in ascending order) and returns those with p-values less than or equal to some threshold, e.g., 0.01.

Architecture of a Metadata System in a Metrics Engine

FIG. 1 shows the overall system environment for reporting based on instrumented software, according to an embodiment. The overall system environment includes an instrumentation analysis system 100, one or more client devices 120, an administration system 160, and a reporting system 150. In other embodiments, more or less components than those indicated in FIG. 1 may be used. For example, client devices 120, administration system 160, and reporting system 150 may interact with instrumentation analysis system 100 via a network (not shown in FIG. 1). Furthermore, there may be more or less instances of each system shown in FIG. 1; for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g., "130" in the text refers to reference numerals "130a" and/or "130b" in the figures).

The instrumentation analysis system 100 receives data comprising values of metrics sent by different client devices 120 (e.g., the instrumentation analysis system 100 may also be referred to herein as an analysis system or a data analysis system). A client device 120 executes instrumented software, for example, application 130. Although, application 130 is shown in FIG. 1 as an example of instrumented software, the techniques disclosed herein are not limited to application software but are applicable to other kinds of software, for example, server software, software executing on customer devices, websites, and so on. Furthermore, a client device 120 may include any computing system that is configured to execute instrumented software, whether or not it is used for development of improved software. For example, the client device 120 may be a computing system used for testing purposes, staging purposes, or any production system executing in an enterprise.

The software executing on a client device 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. In an implementation, the application 130 may send data to the instrumentation analysis system 100 by invoking an application programming interface (API) supported by the instrumentation analysis system 100.

A gauge comprises instructions to measure certain runtime characteristics of the application 130, for example, heap size, number of cache misses or hits, active memory used, central processing unit (CPU) utilization, total time taken to respond to a request, time taken to connect to a service, and so on. A gauge may also be used to track certain application-specific parameters or business-related values, for example, number of transactions, number of users, and so on. The gauge may be invoked periodically based on an interval that is configurable. The value of the gauge is sent to instrumentation analysis system 100 periodically.

A software program may be instrumented to generate spans with a common field in their data structures to designate spans that are part of a common trace. For example, the spans may include a trace identifier such that spans with the same trace identifier are a part of the same trace. A length of each trace may be determined by an administrator through the administration system 160.

The administration system 160 allows a privileged user, for example, a system administrator, to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify the application 130.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of the application 130.

Furthermore, the instrumentation analysis system 100 provides separation of the metadata describing the data streams from the data of the data streams. Accordingly, the amount of data that needs to be transmitted from the client devices 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be configured to generate a histogram to analyze generated spans and traces. In an implementation, the reporting system 150 may include a histogram generator 140 that interacts with the instrumentation analysis system 100 to generate a histogram.

The reporting system 150 can be a conventional computer system (e.g., a desktop or laptop computer), a tablet, or a device having computer functionality such as a personal digital assistant (PDA), a mobile telephone, a smart phone, or another suitable device. The reporting system 150 interacts with instrumentation analysis system 100 via a network.

The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage, and input/output controller. The computing system used for hosting the instrumentation analysis system 100 is typically a server-class system that uses powerful processors, large memory, and fast input/output systems compared to a typical computing system used, for example, as a reporting system 150.

In an embodiment, data from several client devices 120 may be consolidated, for example, by a server and the combined data sent to the instrumentation analysis system 100. For example, an enterprise may install a server that receives data streams internally from different client devices 120 and sends the combined data in a batch form to the instrumentation analysis system 100 periodically. This allows efficiency of external communication from the enterprise.

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are CPU load, cache misses, cache hits, and so on. A value of a dimension is also referred to as a coordinate value of the data stream. A coordinate value may be represented as a metadata attribute stored in a metadata store. Given the two dimensions of source and metric, a data stream may be identified by providing the two coordinates representing the source and the metric, for example, (server1, cpu_load) or (server2, memory_usage).

A data stream may be characterized by multiple dimensions more than the two dimensions (i.e., source and metric name) described above. For example, if each server has multiple CPUs, a dimension cpu_id may be included. Accordingly, each data stream obtained from a system may be characterized by (source_id, cpu_id, metric_name), i.e., a source identifier, a CPU identifier, and a name for the metric. Examples of data streams identified using three coordinates include (server1, cpu1, load), (server1, cpu2, load), (server2, cpu1, load), (server2, cpu2, load), and so on. According to embodiments, each data stream may include spans and traces.

As another example of a dimension, a system may define customer name as a dimension. The name of the customer may be reported by the instrumented software, for example, based on the configuration parameters of the instrumented software executing on a client device 120. The customer name may be specified for the instrumented software using a system property. The instrumented software includes the customer name when it identifies a data stream associated with that particular customer. The ability to associate a data stream with a customer allows the instrumentation analysis system to perform customer-specific analysis, for example, report on usages of systems for each customer, identify customers reporting more than a threshold number of errors, and so on.

A data stream may be obtained from instrumented software or may be generated as a result of execution of blocks of a data stream language program within the instrumentation analysis system 100. A data stream may also comprise data stored in the instrumentation analysis system 100, for example, in a data store, such as a time series data store 260, described herein.

Figure 2:
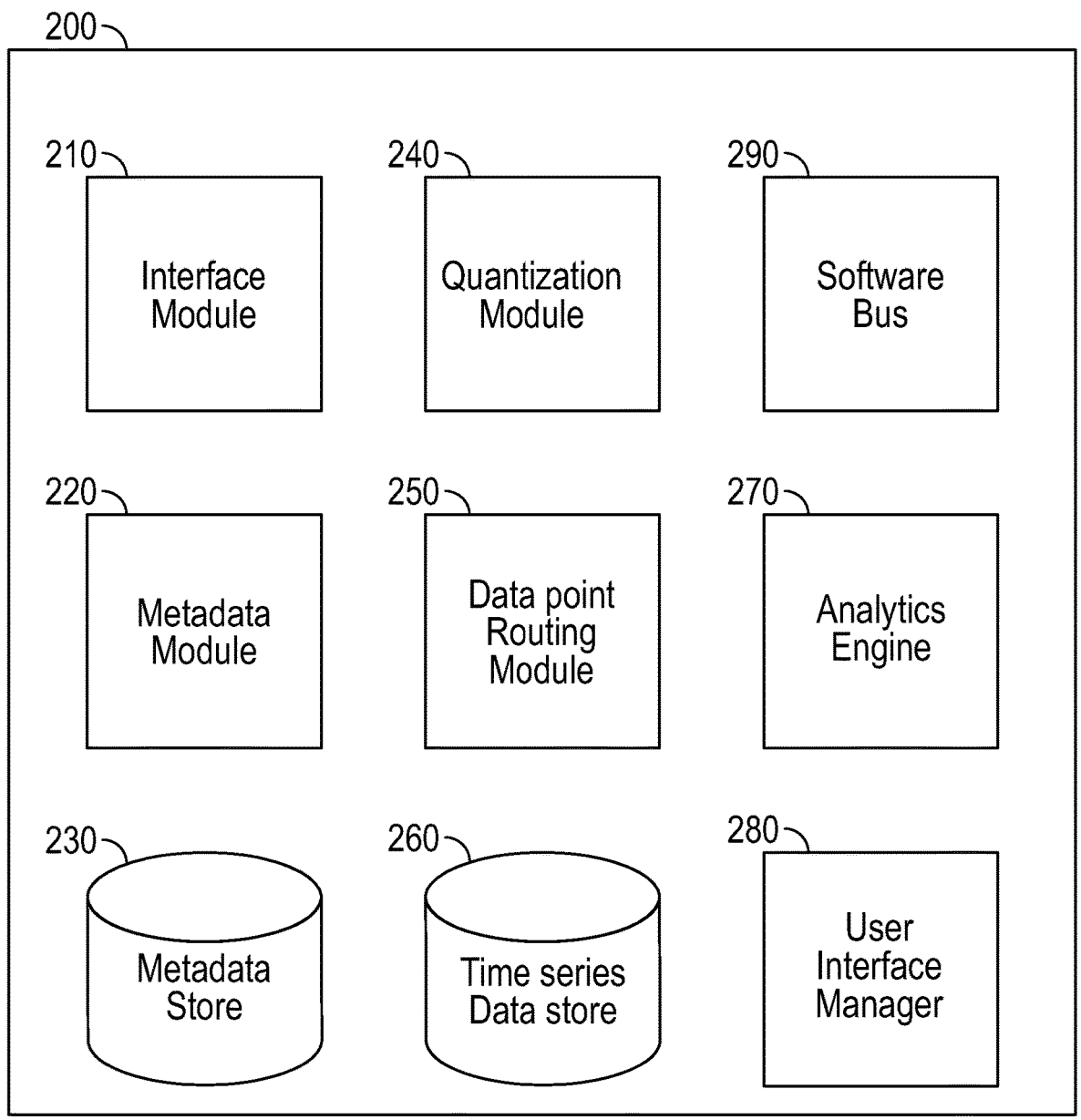
FIG. 2 shows an architecture of a system for processing data streams received from instrumented software, according to an embodiment of the present disclosure.

FIG. 2 shows an architecture of a system for processing data streams received from instrumented software, according to an embodiment. The instrumentation analysis system 200 includes an interface module 210, a quantization module 240, metadata module 220, metadata store 230, a data point routing module 250, an analytics engine 270, a user interface manager 280, a time series data store 260, and a software bus 290. In other embodiments, the instrumentation analysis system 200 may include other modules not described herein. Functionality indicated as provided by a particular module may be implemented by other modules instead.

The interface module 210 receives requests from external systems, for example, client devices 120 that communicate with the instrumentation analysis system 200. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams comprising spans and traces from one or more client devices 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, and one or more properties associated with the data.

In an embodiment, the timestamp associated with a tuple represents the time that the data value was received by the instrumentation analysis system 200. The properties associated with the data may be provided in the form of name-value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 200.

The metadata module 220 receives and stores metadata information describing various data streams received from the client devices 120. In an embodiment, the metadata stored in the metadata module 220 is received from a user, for example, a system administrator interacting with the instrumentation analysis system 200 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata store 230 stores the metadata objects and their associations with the data streams. The metadata store 230 stores an identifier (ID) for each metadata object and the properties represented by the metadata object. In an embodiment, each data stream is associated with a time series identifier that uniquely identifies the data stream. The metadata store 230 stores an index that maps each metadata object to a set of time series identifier values. The metadata store 230 may receive instructions to modify a metadata object. For example, the metadata store 230 may receive instructions to modify, add, or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The time series data store 260 stores data received from various sources, for example, client devices 120. The time series data store 260 is also referred to herein as a time series database (or TSDB). In an embodiment, the time series data store 260 also stores the time series data after the data is quantized. The time series data store 260 may also store rollup data for each time series. The time series data store 260 also stores results of various analytics requests, for example, results of various reports requested by a user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 200 to provide data of data streams to other modules of the instrumentation analysis system 200. A data stream language program may send a data stream to the software bus 290. Other modules, for example, fetch modules, window modules, and so on, can read the data from the software bus 290 and perform further processing on the data. For example, a data stream output of a data stream language program published on the software bus 290 may be identified by a find block of another data stream language program executing as a job.

Architecture for Processing Input Data

Figure 3:
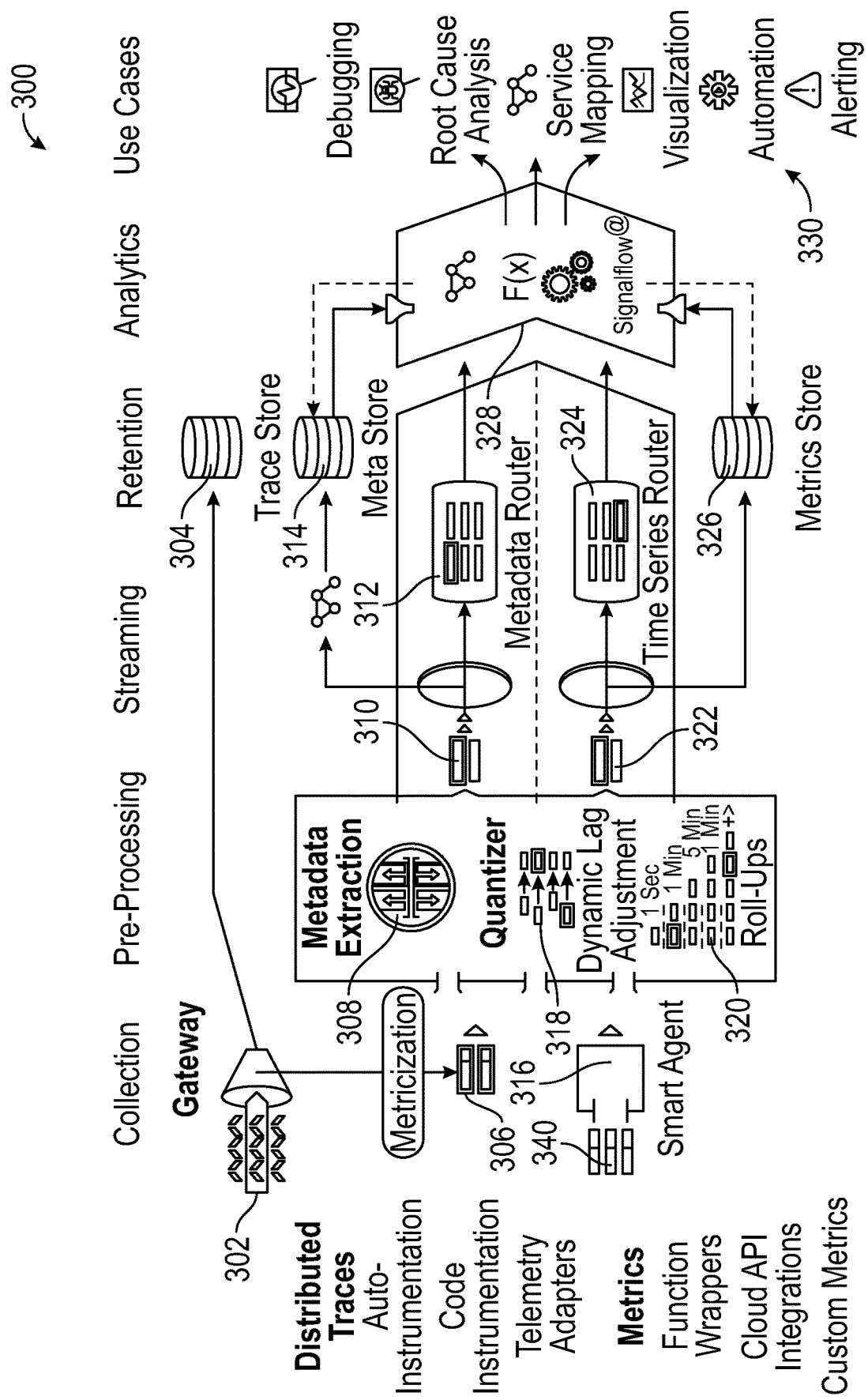
FIG. 3 shows an overall system architecture for processing input data, according to an embodiment of the present disclosure.

FIG. 3 shows an overall system architecture 300 for processing input data, according to an embodiment of the present disclosure. The architecture 300 may be configured to receive an input data stream 302. The input data stream 302 may include tail-sampled traces that are stored in a trace database 304. The input data stream 302 may also be metricized to generate metricized data 306. Metadata 310 may be extracted from the metricized data 306 through a metadata extractor 308.

According to embodiments, input data 340 may be processed by a smart agent 316 and quantized into metrics 322 to adjust for lag 318 based on roll-up periods 320. For example, the input data 340 may be received from cloud services (e.g., AMAZON WEB SERVICES, AZURE, GOOGLE CLOUD, etc.), open source software, language libraries (e.g., JAVA, PYTHON, GOLANG, etc.), operating systems, etc. In an implementation, the input data 340 may be processed based on a series of time windows (e.g., 1 sec, 1 min, 5 min, 1 hour, etc.). Multiple roll-ups including sum, count, min, max, lag, etc. may also be calculated.

According to embodiments, the metadata 310 may be processed separately from the metrics 322. For example, the metadata 310 may be stored in a metadata database 314 and also processed through a metadata router 312. The metrics 322 may be stored in a metric database 326 and processed through a time series router 324. The metadata 310 and metrics 322 may further be processed through a signal flow 328 as inputs to data science processes 330. For example, the data science processes 330 may include automatic outlier analysis, trace analysis, and incident analysis, among others.

FIG. 4 shows an example data structure 400, according to an embodiment of the present disclosure. For example, the data structure 400 may include a timestamp 402, a value 404, and a metric time series (MTS) object 420. The MTS object 420 may include multiple dimensions (e.g., metadata objects), such as a metric 406, a customer 408, a service 410, and a host 412. In implementations, the metric 406 may be a special case of a dimension. It is understood that an MTS object 420 may include at least one dimension, and as many as over 30 dimensions.

According to embodiments, the MTS object 420 may be identified by a unique combination of dimensions. For example, the illustrated MTS object 420 has four dimensions—one dimension each for a metric 406, a customer 408, a service 410, and a host 412. If dimensions were added, removed, or changed, the MTS object 420 would be recognized as a different MTS object from before.

According to embodiments, names and values may be extracted from the metadata. For example, the names may include tags such as "customer," "service," "host," etc. The values may include corresponding properties of the tags (e.g., keys), such as "num_transactions," "customer_name," "service_name," "host_name," etc. The names may be linked with the values as name-value pairs, such that each dimension of an MTS object includes a name-value pair. For example, as illustrated in FIG. 4, "Customer-Acme," "Metric-Num_Transactions," "Service-Checkout," and "Host-host9" may be name-value pairs for each dimension of the MTS object 420. In this way, each MTS object 420 can point to multiple dimensions.

Figure 5:
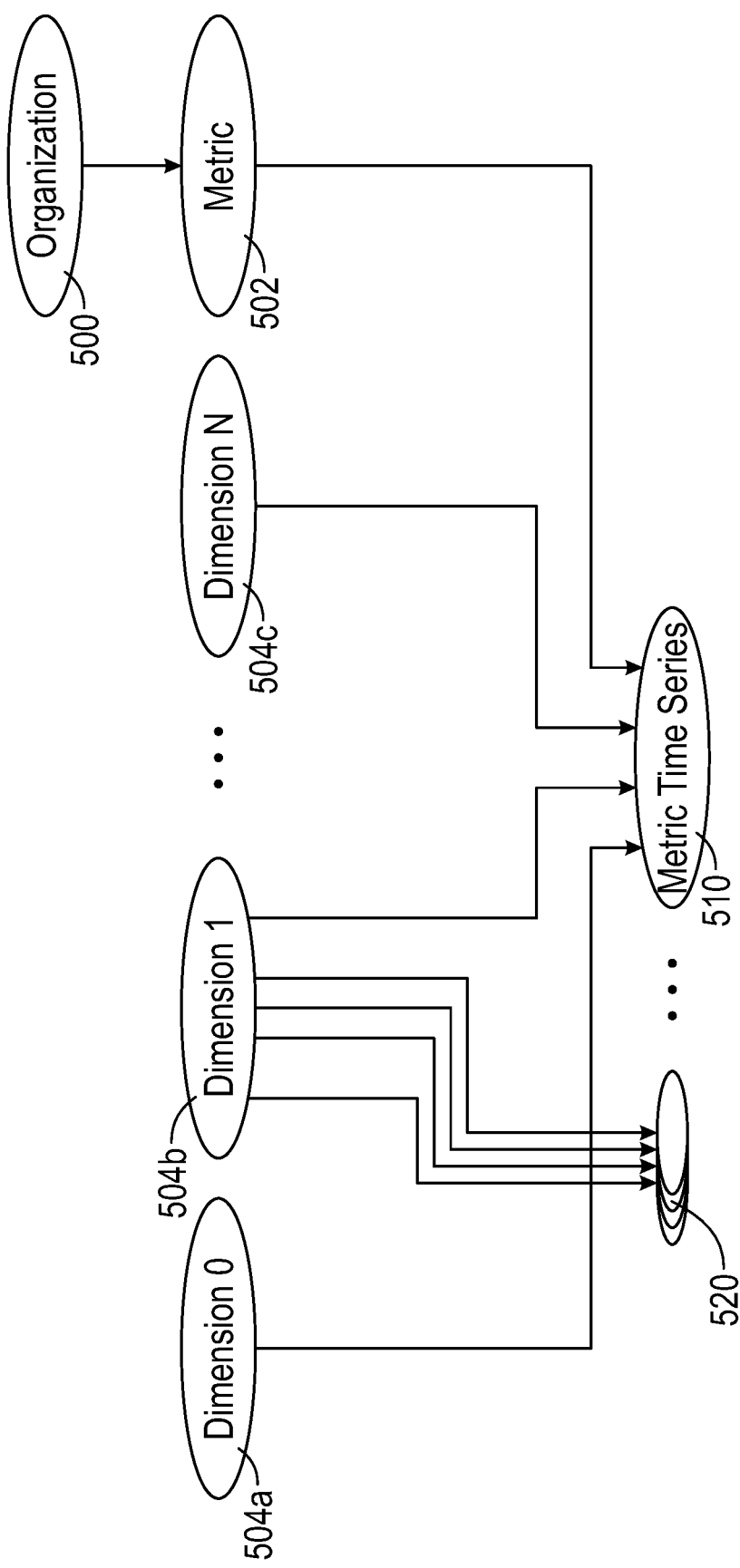
FIG. 5 shows an example of a conventional metric time series (MTS) object, according to an embodiment of the present disclosure.

FIG. 5 shows an example of a conventional metric time series (MTS) object 510. As illustrated, the MTS object 510 is de-normalized, which means that the MTS object 510 inherits all of the properties of dimensions 504a, 504b, 504c, metric 502, and organization 500. For example, the dimensions 504 may be for host, cluster, service, etc. The metric 502 is a special dimension with a fixed, well-known name.

Each dimension 504 may have an immutable name and value, and a unique name-value combination (e.g., in the namespace of the tenant). Each dimension 504 may also optionally store additional mutable properties.

Conventionally, any change(s) to any of the properties of dimensions 504a, 504b, 504c, metric 502, and/or organization 500 would be copied down to the MTS object 510. Conventionally, the dimensions 504a, 504b, and 504c may also be linked to millions of other MTS objects 520. As a result, any change(s) to any of the properties of any of dimensions 504a, 504b, 504c, metric 502, and/or organization 500 would also be copied down to the millions of other MTS objects 520 as well. This is problematic because it is resource intensive and causes undesirable delays to the architecture 300.

Virtual Private Cloud

Cloud computing provides users access to on-demand computer system resources, such as data storage and computing power, without direct active management by the users. Specifically, cloud computing utilizes multiple data centers that include compute and storage resources connected by a network. All of these resources may be virtualized into a larger shared pool of resources, which may be intelligently and automatically orchestrated to provide computing power to adapt to a user's needs.

As a result, cloud computing is a powerful tool that has allowed software providers to efficiently and effectively distribute software services to end users. Software as a service (SaaS) is an example of cloud computing where a software provider's applications are accessible to users as on-demand software through a web browser or a program interface.

Traditional SaaS delivery models provide APIs and endpoints to customers. Hosting and management of the deployment are conventionally provided by a vendor. However, deployments of SaaS may require management of thousands of nodes, which may be very expensive. As a result, hosting costs typically take up a large portion of vendor costs.

According to an embodiment, a cloud environment is configured to allow a third party (e.g., a SaaS provider) to access and operate a SaaS deployment in a cloud environment that also operates other software. The SaaS deployment and the SaaS provider's access to the cloud environment are separate from the other software running in the cloud environment. The SaaS also monitors the other software, such that there is partial isolation of the SaaS deployment portion from the rest of the cloud environment.

The disclosed system addresses a problem in traditional cloud computing tied to computer technology, namely, the technical problem of distributing a SaaS. The disclosed system solves this technical problem by providing a solution also rooted in computer technology, namely, by providing a SaaS provider access to operate a SaaS deployment in a cloud environment that also operates other software. The disclosed subject technology further provides improvements to the functioning of the computer itself because it improves efficiency in executing the SaaS deployment.

Figure 6:
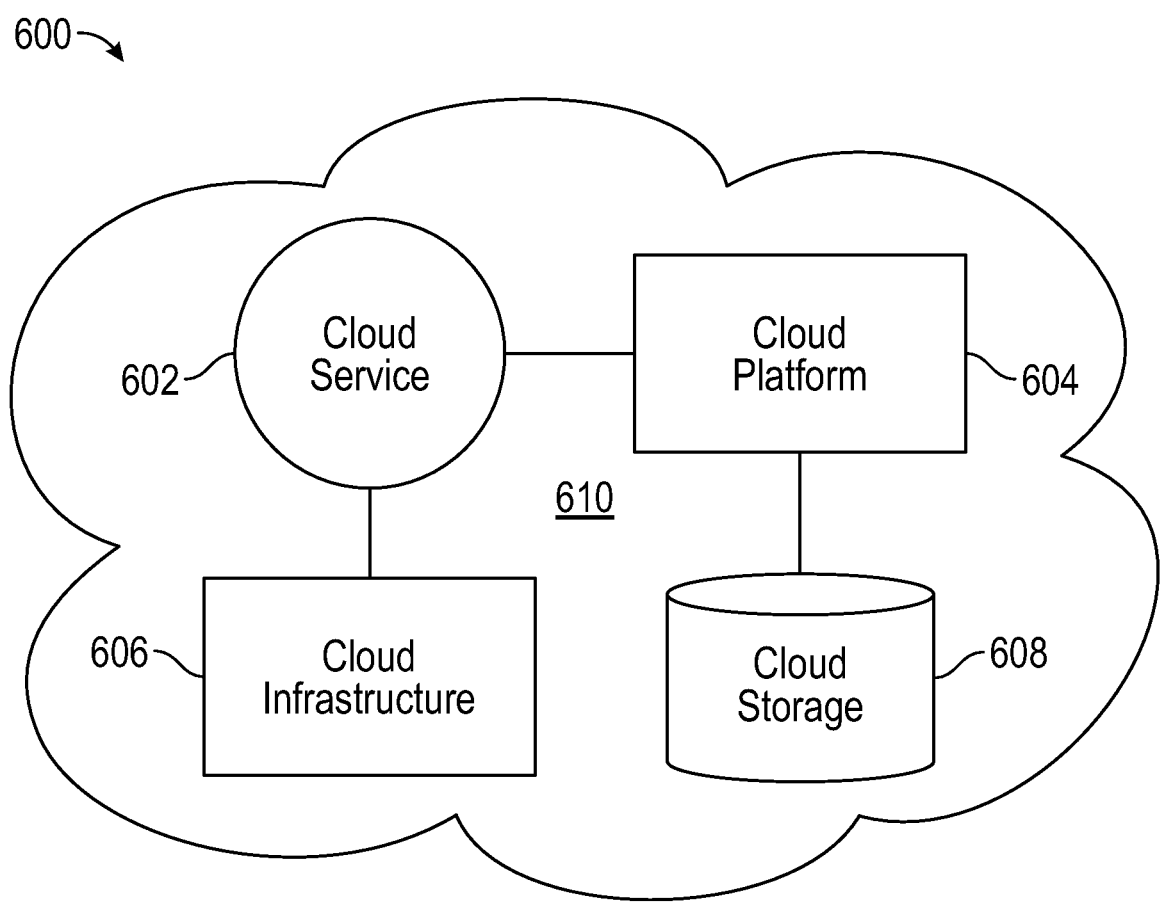
FIG. 6 illustrates an exemplary cloud architecture for implementing server-based restricted access storage, according to an embodiment of the present disclosure.

FIG. 6 illustrates an exemplary cloud architecture 600 for implementing server-based restricted access storage (e.g., a virtual private cloud), according to an embodiment of the present disclosure. The cloud architecture 600 may include a cloud 610 having a cloud service 602, a cloud platform 604, a cloud infrastructure 606, and cloud storage 608. For example, the cloud service 602 may include a SaaS, the cloud platform 604 may include a web frontend, the cloud infrastructure 606 may include virtual machines (e.g., billing virtual machines), and the cloud storage 608 may include databases.

According to embodiments, the cloud architecture 600 may be configured as a private cloud. For example, the cloud architecture 600 may be hosted by a private host (e.g., a single tenant, such as an enterprise) that only allows associates of the private host (e.g., employees of the enterprise) to access the resources of the cloud architecture 600. The private host takes on the costs and management of the cloud architecture 600, which allows for customization to fit the needs of the private host. In contrast, a public cloud has multiple tenants, so customizations are more limited than in a private cloud. As a result, private clouds are preferable for large tenants that desire customization and limited access to users.

Figure 7:
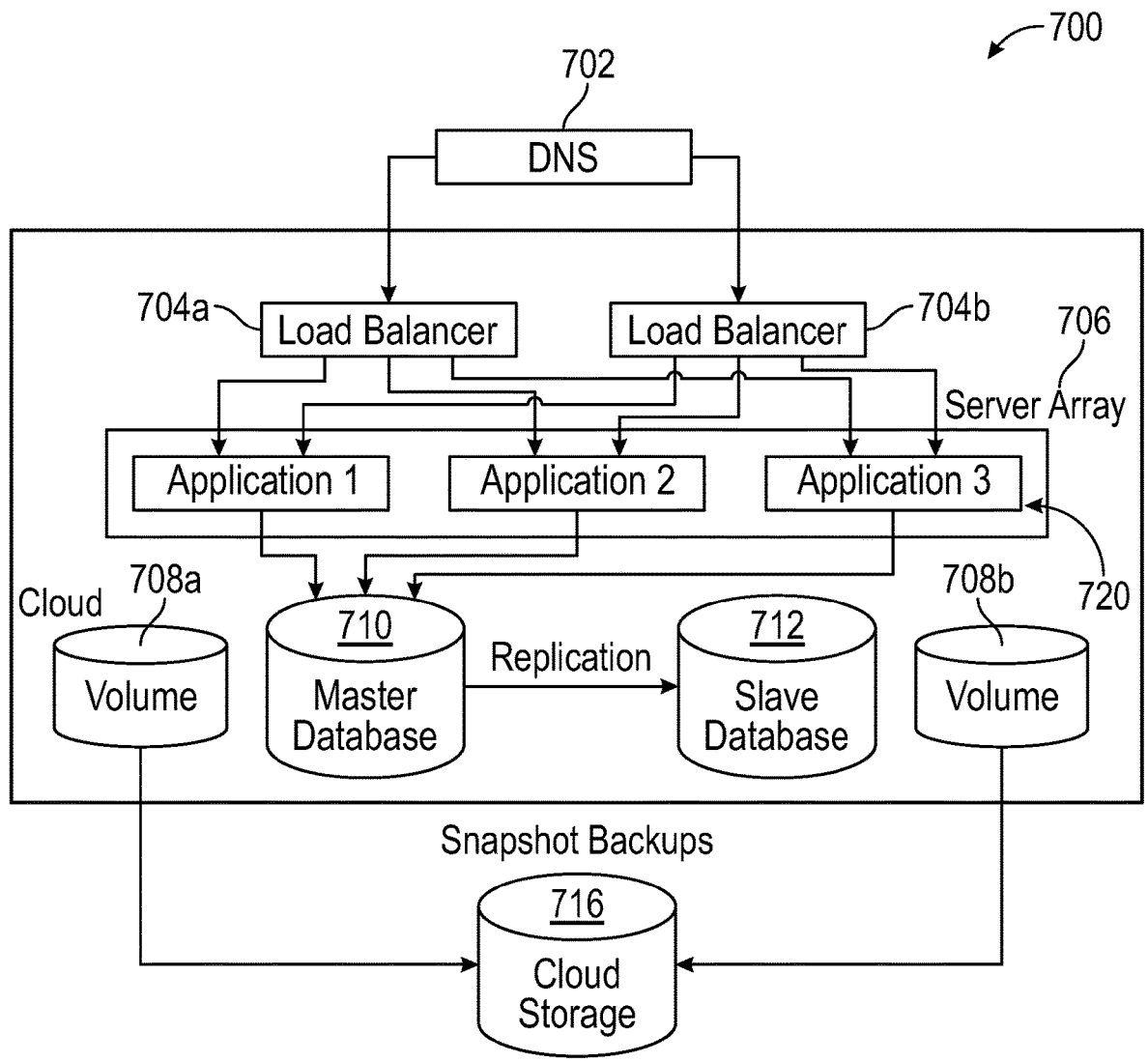
FIG. 7 illustrates an exemplary cloud infrastructure for implementing server-based restricted access storage, according to an embodiment of the present disclosure.

FIG. 7 illustrates an exemplary cloud infrastructure 700 for implementing server-based restricted access storage, according to an embodiment of the present disclosure. The cloud infrastructure 700 may include a domain name system (DNS) 702, load balancers 704 (e.g., a first load balancer 704a, a second load balancer 704b), a server array 706 that hosts multiple applications 720, cloud volume 708 (e.g., a first cloud volume 708a, a second cloud volume 708b), a master database 710, a slave database 712, and cloud storage 716.

According to aspects, the DNS 702 directs network traffic through the load balancers 704, which aid in auto-scaling by distributing the network traffic across multiple servers of the server array 706 to each of the applications 720. The applications 720 may be configured to access data from the master database 710. If the master database 710 fails, then the slave database 712 provides backup to the master database 710. Additional redundancy is added by backing up the cloud volume 708 to the cloud storage 716.

As described herein, the cloud infrastructure 700 may be incorporated into the cloud architecture 600 of FIG. 6. For example, the cloud infrastructure 606 of FIG. 6 may be implemented as the cloud infrastructure 700 of FIG. 7. Furthermore, the cloud infrastructure 700 may be utilized to support a private cloud, as described above in FIG. 6.

Figure 8:
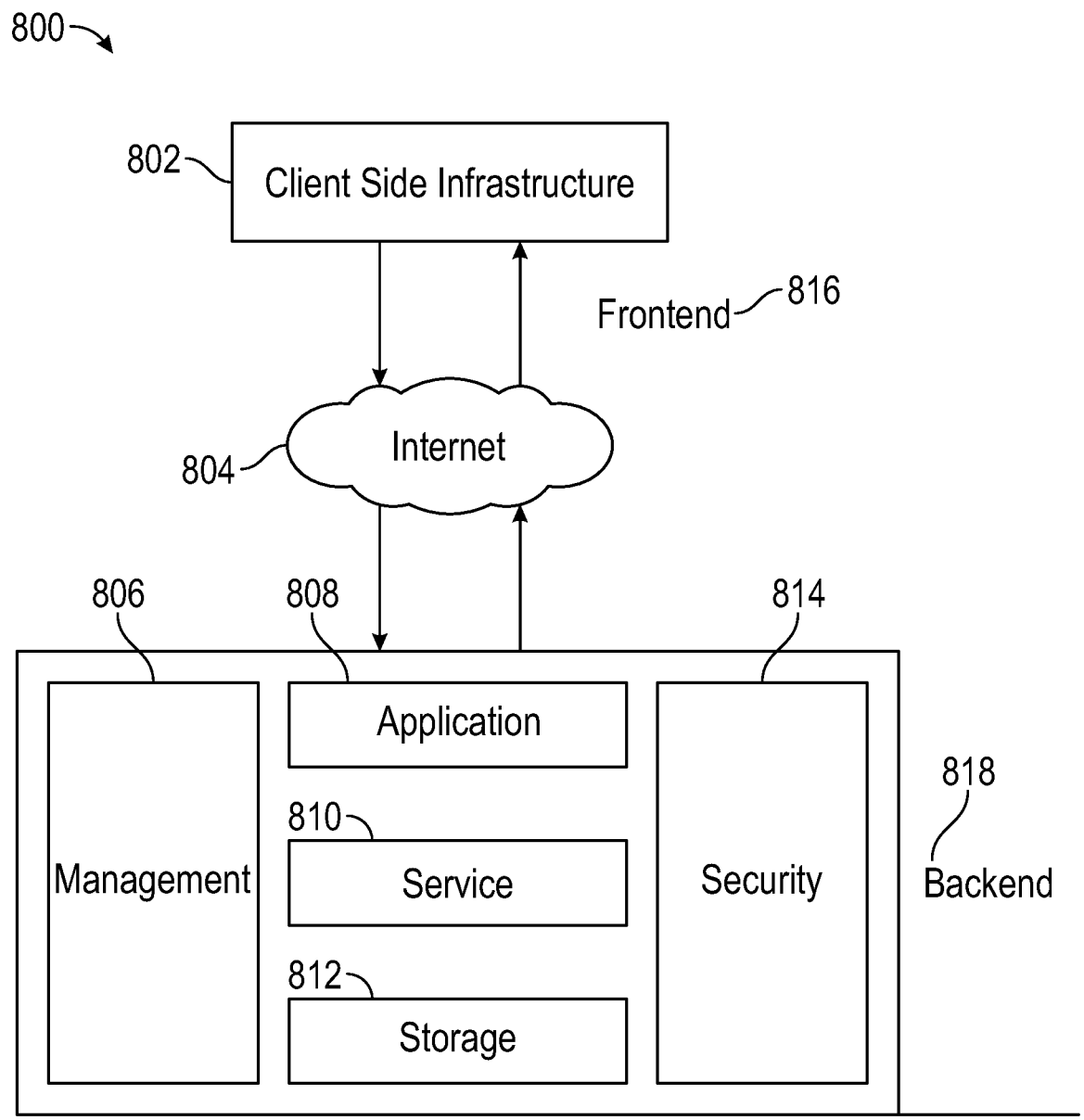
FIG. 8 illustrates an exemplary frontend and backend for a cloud computing architecture for implementing server-based restricted access storage, according to an embodiment of the present disclosure.

FIG. 8 illustrates an exemplary frontend 816 and backend 818 for a cloud computing architecture 800 for implementing server-based restricted access storage, according to an embodiment of the present disclosure. The frontend 816 may include client side infrastructure 802. For example, the client side infrastructure 802 may include user interfaces and applications, such as a web browser, for accessing the Internet 804. In an implementation, the frontend 816 may be coupled to the backend 818 through the Internet 804.

According to aspects, the backend 818 may form the basis for the cloud architecture 600 described above in FIG. 6. For example, the backend 818 may include management 806, application 808, service 810, storage 812, and security 814. The management 806 may include software and technologies designed for operating and monitoring applications (e.g., application 808), data (e.g., storage 812), and services (e.g., service 810) residing in the cloud (e.g., the cloud architecture 600). The management 806 enables cloud computing resources to perform optimally and properly interact with users and other services. The storage 812 may include databases that store cloud data that is utilized by the service 810. The service 810 may include cloud-based services, such as infrastructure as a service (IaaS), platform as a service (PaaS), and SaaS, among others. The security 814 may protect all the features of the backend 818 from cybersecurity threats.

Figure 9B:
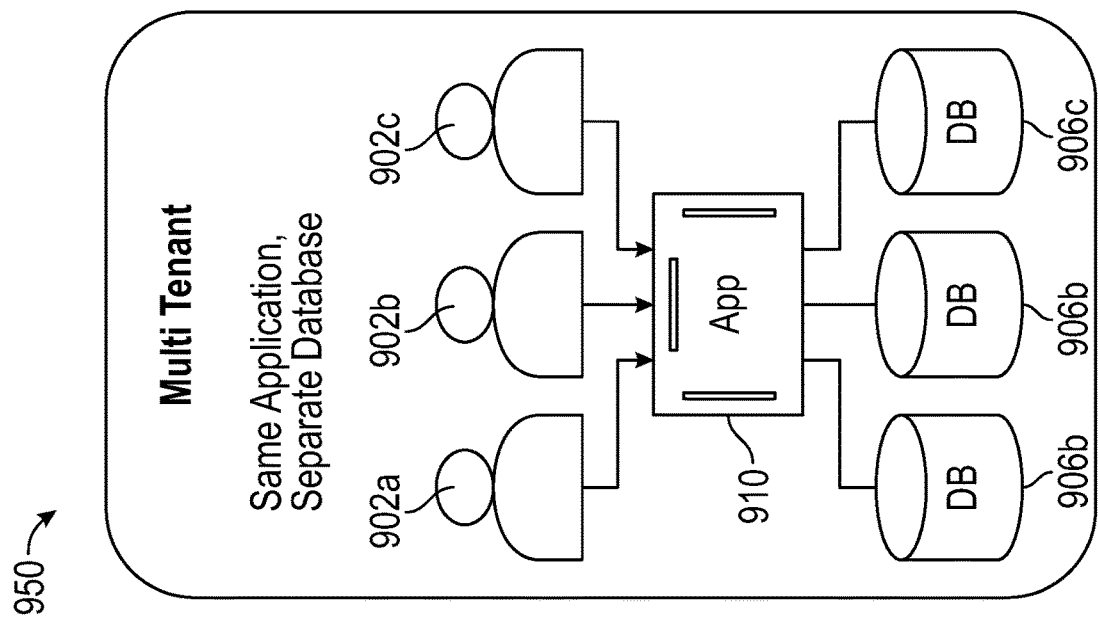
FIGS. 9A and 9B illustrate exemplary software as a service (SaaS) architectures for deployment through server-based restricted access storage, according to an embodiment of the present disclosure.
Figure 9A:
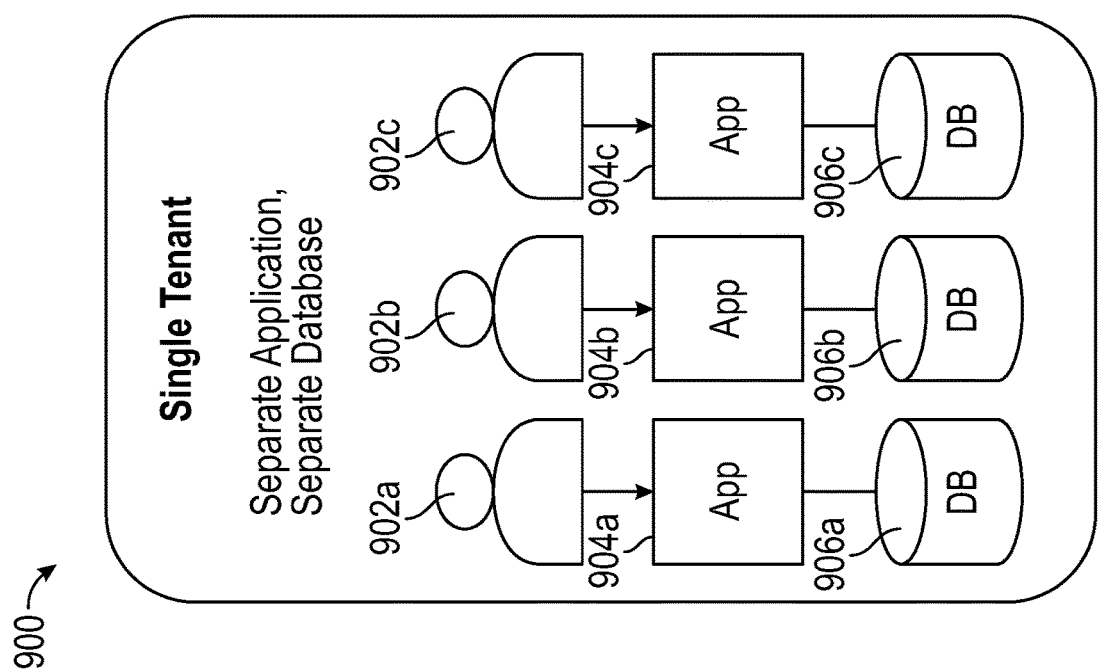

FIGS. 9A and 9B illustrate exemplary software as a service (SaaS) architectures for deployment through server-based restricted access storage, according to an embodiment of the present disclosure. FIG. 9A illustrates a single tenant SaaS architecture 900. For example, separate users 902 (e.g., a first user 902a, a second user 902b, a third user 902c) may access separate application instances 904 (e.g., a first application instance 904a, a second application instance 904b, a third application instance 904c). Each of the separate application instances 904 may access a separate database 906 (e.g., a first database 906a, a second database 906b, a third database 906c). In this way, each user 902 accesses a separate application instance 904, and user data is separated through the separate databases 906 (e.g., the first database 906a, the second database 906b, the third database 906c).

Referring to FIG. 9B, a multi-tenant SaaS architecture 950 may include separate users 902 (e.g., the first user 902a, the second user 902b, the third user 902c), who each access a single application instance 910. The single application instance 910 may access separate databases (e.g., the first database 906a, the second database 906b, the third database 906c) separately based on each user 902. In this way, resources for the application instance 910 are shared by the users 902, while the user data remains separated through the separate databases 906.

According to embodiments, the SaaS architectures 900, 950 may be for a monitoring service that utilizes tracing and sampling, as described above in FIGS. 1-5. For example, the monitoring service may be utilized to aid users in identifying error endpoints for instrumented software executing on user systems.

According to additional embodiments, the SaaS architectures 900, 950 may be implemented through cloud computing technology, as described above in FIGS. 6-8.

Figure 10:
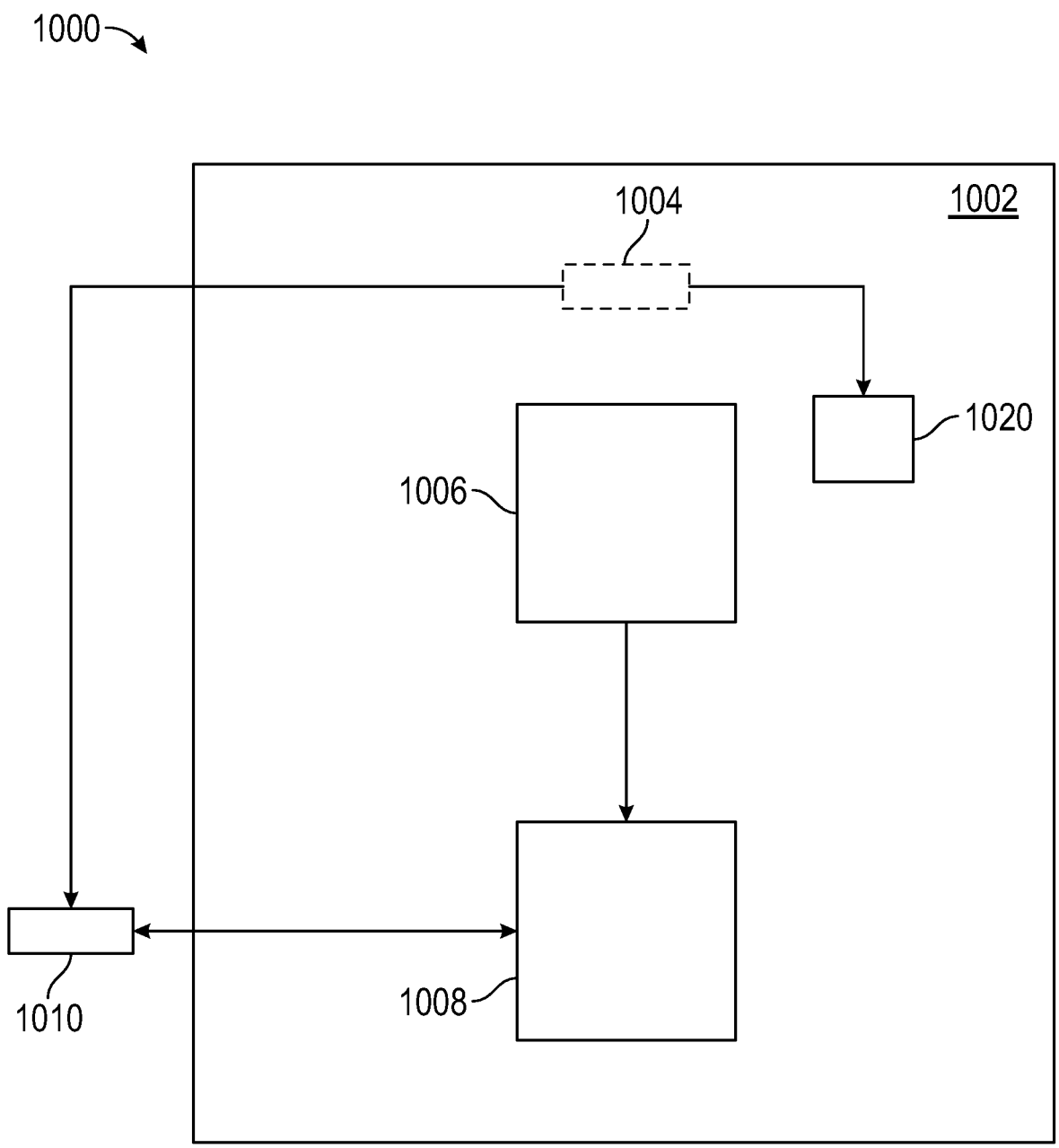
FIG. 10 illustrates exemplary server-based restricted access storage, according to an embodiment of the present disclosure.

FIG. 10 illustrates an exemplary virtual private cloud 1000 (e.g., server-based restricted access storage), according to an embodiment of the present disclosure. The virtual private cloud 1000 may include a host 1004 of a cloud 1002 (e.g., a public or a private cloud), host software 1006, a service provider 1010, a service deployment 1008, and a billing manager 1020. For example, the host 1004 may include an enterprise client of the service provider 1010. The service provider 1010 may provide monitoring services for the host software 1006 through the service deployment 1008. For example, the service deployment 1008 may be a SaaS and the host software 1006 may be instrumented to allow tracing and sampling by the service deployment 1008. The billing manager 1020 may manage billing for usage of the cloud 1002.

According to aspects, the host 1004 may initiate the cloud 1002. After initiating the cloud 1002, the host 1004 may hand over all access and control of the cloud 1002 to the service provider 1010. For example, the host 1004 may provide access credentials (e.g., login credentials) to the service provider 1010 so that the service provider 1010 may utilize the cloud 1002 to deploy the service deployment 1008. The service deployment 1008 may be partially restricted to only accessing the host software 1006, as other host software (not shown) may also be running on the cloud 1002.

According to aspects, the host 1004 may retain access to the billing manager 1020 in order to pay for usage of the cloud 1002. This is because the service provider 1010 does not pay for the usage of the cloud 1002. It is advantageous to have the host 1004 pay for the cloud 1002 because, especially in cases where the host 1004 is a large enterprise, the host 1004 may receive large discounts for hosting the cloud 1002, as opposed to having the service provider 1010 host the cloud 1002. In this way, the service provider 1010 may save on cloud hosting costs, which may be passed on as a discount to the host 1004 for hosting the cloud 1002. Additionally, the virtual private cloud 1000 provides security for the host 1004 because the service deployment 1008 is dedicated to the host software 1006 only, and therefore host data may be isolated at the highest degree possible. Another advantage is that the service provider 1010 is on call at any time because they have direct access to the cloud 1002.

According to embodiments, the host 1004 may create an isolated account/workspace in a public or private cloud of the host 1004. The host 1004 may then give ownership of the cloud to the service provider 1010. The service provider 1010 may then deploys the service deployment 1008 in the workspace/account. The service provider 1010 may also provide service endpoints for the host 1004, and may work with the host 1004 to take care of any routing requirements. Additionally, the service provider 1010 include a guarantee of a minimum service time (e.g., guaranteed uptime for the service deployment 1008 of at least 99.99% to 99.9999%). In an implementation, the service provider completely manages and operates all components of the service deployment 1008. Additionally, the host 1004 and the service provider 1010 may work together to assess the costs associated with the cloud 1002 to ensure that the costs are within expectations.

According to embodiments, the service deployment 1008 may be cloud agnostic (e.g., KUBERNETES, TERRAFORM, DOCKER, etc.). This adds flexibility in deployment and operation in the cloud 1002. The service deployment 1008 may include a microservices-based architecture with first-party services written in cloud agnostic code language (e.g., JAVA, GOLANG, etc.). According to aspects, code pushes may be deployed directly to the cloud 1002 to maintain site reliability.

According to an embodiment, a cloud environment (e.g., the cloud 1002) may be configured to allow a third party (e.g., a SaaS provider) to access and operate a SaaS deployment in a cloud environment that also operates other software. The SaaS deployment (and the SaaS provider's access to the cloud environment) will be separate from the other software running in the cloud environment, but the SaaS will also be monitoring the other software. Therefore, there is no clean isolation of the SaaS deployment portion from the rest of the cloud environment.

According to aspects, a customer (e.g., the host 1004) may host a cloud deployment (e.g., GOOGLE CLOUD PLATFORM, AMAZON WEB SERVICES, AZURE, etc.). The customer may then generate a parent node for the cloud deployment, which the customer may retain access to. A billing identifier for the cloud deployment may be associated with the parent node. A sub-node (e.g., a sub-account) may then be associated with the parent node, which is only accessible by vendor (e.g., the service provider 1010). The vendor may then integrate the sub-node with a single sign-on (SSO) or an identity provider (IDP) to facilitate access to the sub-node. In this way, the sub-node would constructively become the main node, and from there the customer is cut off from everything except billing, which goes to the parent node. Additionally, all vendor services may be deployed on to the cloud deployment (including software and hardware), and access may be given to engineers and operators of the services as well. Thus, the cloud deployment essentially becomes the vendor's to fully manage and operate. Furthermore, the vendor cannot go outside the cloud deployment, nor can the customer go inside the deployment, except for billing.

Figure 11:
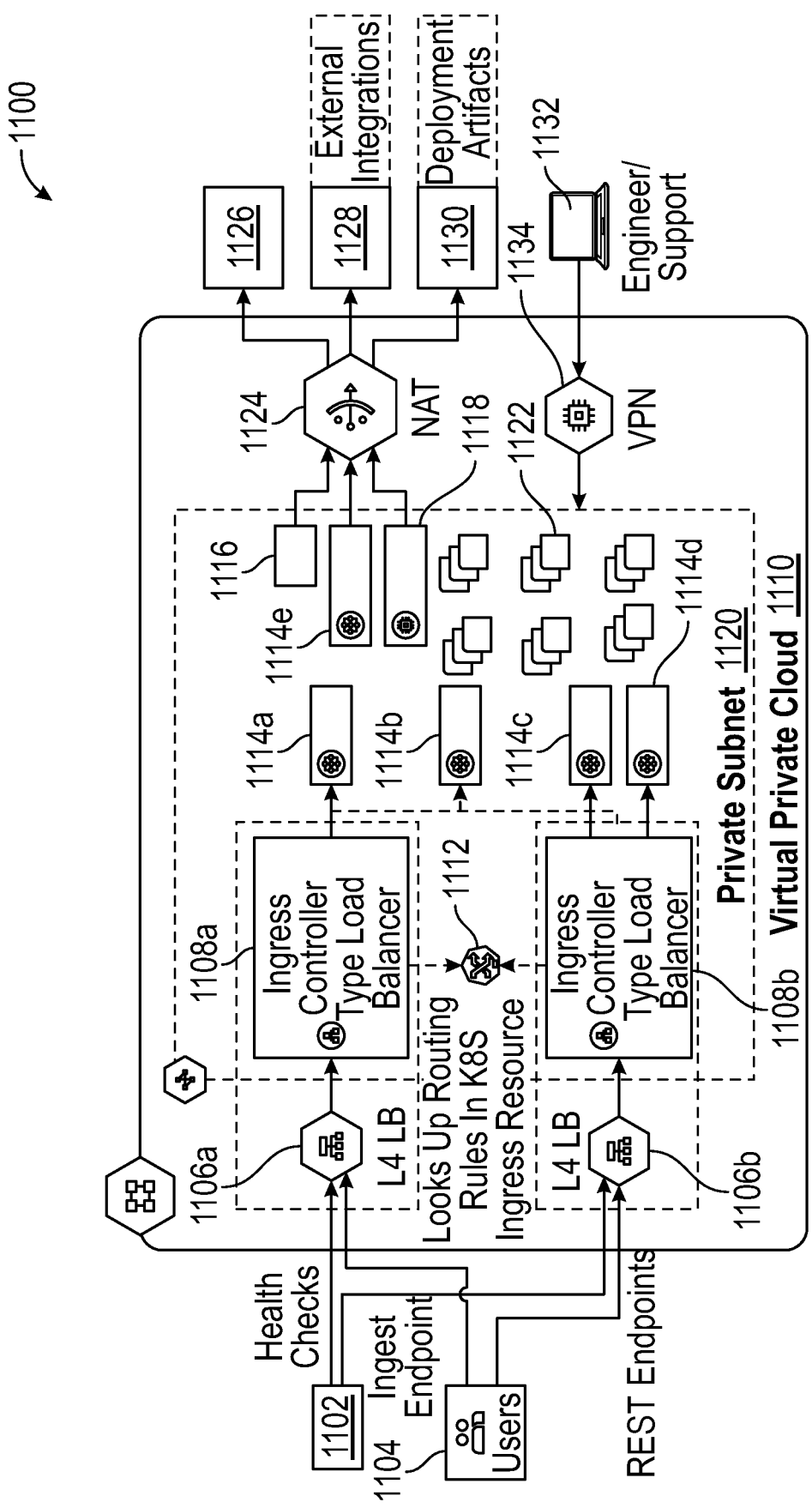
FIG. 11 illustrates an exemplary deployment environment, according to an embodiment of the present disclosure.

FIG. 11 illustrates an exemplary deployment environment 1100, according to an embodiment of the present disclosure. The deployment environment 1100 may include a virtual private cloud 1110 that includes a private subnet 1120. The virtual private cloud 1110 may also include load balancers 1106, a monitoring agent 1116 (e.g., a SaaS), a network address translator 1124, and a virtual private client (VPN) 1134. According to aspects, the private subnet 1120 may include ingress controllers 1108, an ingress resource 1112, microservices 1114, worker nodes 1118, and databases 1122.

According to embodiments, the virtual private cloud 1110 may receive health checks from a website monitoring service 1102, and ingest endpoints and representational state transfer (REST) endpoints from users 1104. For example, a first load balancer 1106a may receive health check from the monitoring service 1102 and ingest endpoints from the users 1104. A second load balancer 1106b may receive health checks from the monitoring service 1102 and REST endpoints from the users 1104.

According to aspects, the load balancers 1106 (e.g., layer 4 load balancers) make routing decisions based on each received packet in accordance with ingress resources controlled by the ingress controllers 1108. For example, the ingress controllers 1108 may be run in a cluster and configure the load balancers 1106. In an implementation, the ingress controllers 1108 may be deployed in a pod along with the load balancers 1106. According to an aspect, the routing decisions may be made based on routing rules in the ingress resource 1112.

According to embodiments, the load balancers 1106 and the ingress controller 1108 control resources consumed by each microservice 1114. For example, the microservices 1114 may include an ingest service 1114a, a default service 1114b (e.g., for unmatched paths), a REST service 1114c, a stream service 1114d, and a notifier service 1114e.

According to aspects, the monitoring agent 1116 may communicate with a monitoring environment 1126. For example, instrumented data regarding software running on the virtual private cloud 1110 may be sent to the monitoring environment 1126. According to aspects, the notifier service 1114e may communicate with external integrations 1128 (e.g., webhooks). Furthermore, worker nodes 1118 may pull deployment artifacts 1130 from third-party applications (e.g., Quay, GitHub). For example, the network address translator 1124 may facilitate communication between the virtual private cloud 1110 and entities outside of the virtual private cloud 1110.

According to an embodiment, an administrator 1132 (e.g., technical support specialist) may access the virtual private cloud 1110 through the VPN 1134. For example, the administrator 1132 may access the databases 1122 of the private subnet 1120 through the VPN 1134 to diagnose errors. This allows support specialists to be on-call 24 hours a day for every day of the year. This significantly reduces mean time to resolution for incidents.

According to aspects, KUBERNETES, TERRAFORM, and DOCKER are used for infrastructure orchestration of the SaaS deployment. The SaaS deployment may be written in JAVA or GOLANG and may be packaged as containers for deployment to any cloud provider's compute instance. The SaaS deployment may also runs on open source software, such as ELASTICSEARCH, CASSANDRA, ZOOKEEPER, KAFKA, etc., which are highly fault-tolerant and packaged to be deployed to any cloud provider as well. Furthermore, the SaaS infrastructure and platform may be designed to be self-healing which helps operate them as private deployments with minimal overhead.

According to aspects, code pushes for the SaaS may follow continuous integration and continuous delivery (CI/CD) best practices. Code may also be deployed to all production realms alike, including to the virtual private cloud 1110.

According to aspects, configuration management across all production realms may be through Zookeeper and change management may be orchestrated using a version control system such as GitHub. This helps managing configuration for deployments with varying criteria, including private deployment, to be operationally efficient.

Process for Deploying a SaaS Through Server-Based Restricted Access Storage

The techniques described herein may be implemented as method(s) that are performed by physical computing device(s); as one or more non-transitory, computer-readable storage media storing instructions which, when executed by computing device(s), cause performance of the method(s); or, as physical computing device(s) that are specially configured with a combination of hardware and software that causes performance of the method(s).

Figure 12:
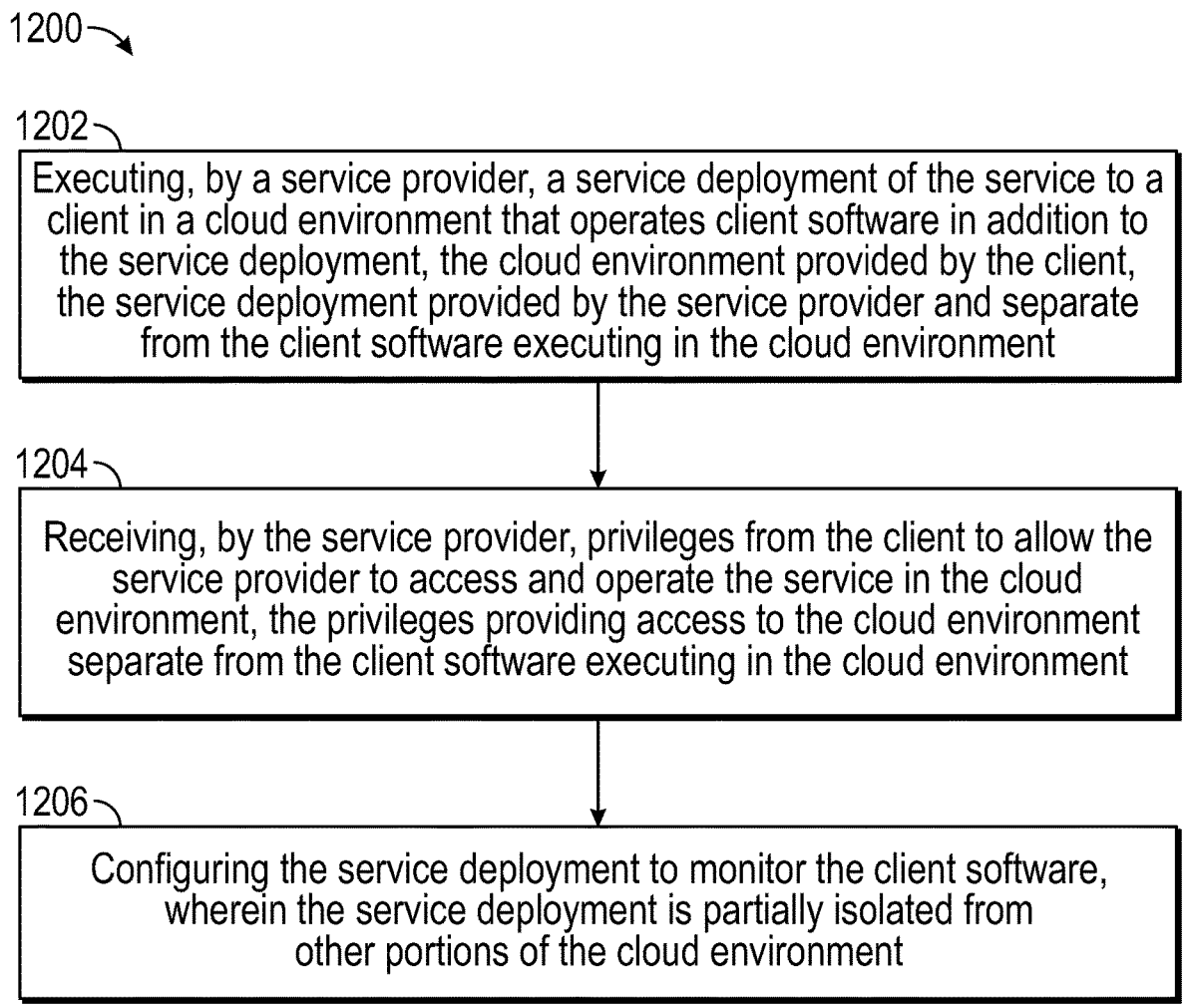
FIG. 12 is a flow diagram illustrative of an embodiment of a process for deploying a SaaS through server-based restricted access storage, according to embodiments of the present disclosure.

FIG. 12 is a flow diagram illustrative of an embodiment of a process 1200 for distributing a service through server-based restricted access storage (e.g., a virtual private cloud), according to embodiments of the disclosure. For explanatory purposes, the steps of the example process 1200 are described herein as occurring in serial, or linearly. However, multiple instances of the example process 1200 may occur in parallel, and/or the various steps may be performed concurrently and/or in a different order or sequence than is described herein.

At step 1202, a service provider executes a service deployment of a service to a client in a cloud environment that operates client software in addition to the service deployment. The cloud environment may be provided by the client. The service deployment may be deployed by a service provider and is separate from the client software executing in the cloud environment.

At step 1204, the service provider may receive privileges from the client to allow the service provider to access and operate the service in the cloud environment. The privileges may provide access to the cloud environment separate from the client software executing in the cloud environment.

At step 1206, the service deployment may be configured to monitor the client software, wherein the service deployment is partially isolated from other portions of the cloud environment.

According to aspects, step 1202 may include executing a service deployment 1008 of a service to a client (e.g., host 1004) in a cloud environment (e.g., 1002) that operates client software 1006 in addition to the service deployment 1008. The cloud environment may be provided by the client. The service deployment 1008 may be deployed by a service provider 1010 and is separate from the client software 1006 executing in the cloud environment.

According to aspects, at step 1204, the service provider 1008 may receive privileges (e.g., access to the cloud 1002) from the client to allow the service provider 1010 to access and operate the service in the cloud environment. The privileges may provide access to the cloud environment separate from the client software 1006 executing in the cloud environment.

According to aspects, at step 1206 the service deployment 1008 may be configured to monitor the client software 1006, wherein the service deployment 1008 is partially isolated from other portions of the cloud environment.

According to embodiments, the service is cloud agnostic. According to embodiments, the service includes at least one of an IaaS, a PaaS, and/or SaaS. According to embodiments, the service includes microservices.

According to embodiments, the process 1200 further includes managing the cloud environment through an administrator of the service provider.

According to embodiments, the process 1200 further includes integrating administrator privileges of the cloud environment into a sub-environment, and accessing the sub-environment through a single sign-on (SSO) or an identity provider (IDP).

According to embodiments, the process 1200 further includes integrating administrator privileges of the cloud environment into a sub-environment, wherein an administrator of the service provider has exclusive access to a part of the sub-environment.

According to embodiments, the process 1200 further includes deploying software associated with the service through a client cloud account associated with the cloud environment.

According to embodiments, the process 1200 further includes deploying hardware associated with the service through a client cloud account associated with the cloud environment.

According to embodiments, the process 1200 further includes generating an identifier for a client cloud account associated with the cloud environment, and associating the identifier with the client cloud account.

What is claimed is:

1. A computer-implemented method for distributing a service, comprising:
    executing, by a service provider, a service deployment of the service to a client in a cloud environment that operates client software in addition to the service deployment, the cloud environment provided by the client, the service deployment provided by the service provider and separate from the client software executing in the cloud environment;
    receiving, by the service provider, privileges from the client to allow the service provider to access and operate the service in the cloud environment, the privileges providing access to the cloud environment separate from the client software executing in the cloud environment; and
    configuring the service deployment to monitor the client software, wherein the service deployment is partially isolated from other portions of the cloud environment.

2. The computer-implemented method of claim 1, wherein the service is cloud agnostic.

3. The computer-implemented method of claim 1, further comprising:
    managing the cloud environment through an administrator of the service provider.

4. The computer-implemented method of claim 1, further comprising:
    integrating administrator privileges of the cloud environment into a sub-environment; and
    accessing the sub-environment through a single sign-on (SSO) or an identity provider (IDP).

5. The computer-implemented method of claim 1, further comprising:
    integrating administrator privileges of the cloud environment into a sub-environment, wherein an administrator of the service provider has exclusive access to a part of the sub-environment.

6. The computer-implemented method of claim 1, further comprising:
    deploying software associated with the service through a client cloud account associated with the cloud environment.

7. The computer-implemented method of claim 1, further comprising:
    deploying hardware associated with the service through a client cloud account associated with the cloud environment.

8. The computer-implemented method of claim 1, wherein the service comprises a software as a service (SaaS).

9. The computer-implemented method of claim 1, wherein the service comprises microservices.

10. The computer-implemented method of claim 1, further comprising:
    generating an identifier for a client cloud account associated with the cloud environment; and
    associating the identifier with the client cloud account.

11. A system for distributing a service, the system comprising:
    at least one memory having instructions stored thereon; and
    at least one processor configured to execute the instructions, wherein the at least one processor is configured to:
        execute, by a service provider, a service deployment of the service to a client in a cloud environment that operates client software in addition to the service deployment, the cloud environment provided by the client, the service deployment provided by the service provider and separate from the client software executing in the cloud environment;
        receive, by the service provider, privileges from the client to allow the service provider to access and operate the service in the cloud environment, the privileges providing access to the cloud environment separate from the client software executing in the cloud environment; and
        configure the service deployment to monitor the client software, wherein the service deployment is partially isolated from other portions of the cloud environment.

12. The system of claim 11, wherein the service is cloud agnostic.

13. The system of claim 11, wherein the processor is further configured to:
    manage the cloud environment through an administrator of the service provider.

14. The system of claim 11, wherein the processor is further configured to:
    integrate administrator privileges of the cloud environment into a sub-environment; and
    access the sub-environment through a single sign-on (SSO) or an identity provider (IDP).

15. The system of claim 11, wherein the processor is further configured to:
  integrate administrator privileges of the cloud environment into a sub-environment, wherein an administrator of the service provider has exclusive access to a part of the sub-environment.

16. The system of claim 11, wherein the processor is further configured to:
  deploy software associated with the service through a client cloud account associated with the cloud environment.

17. The system of claim 11, wherein the processor is further configured to:
  deploy hardware associated with the service through a client cloud account associated with the cloud environment.

18. The system of claim 11, wherein the service comprises a software as a service (SaaS).

19. The system of claim 11, wherein the processor is further configured to:
  generate an identifier for a client cloud account associated with the cloud environment; and
  associate the identifier with the client cloud account.

20. A non-transitory computer-readable storage medium comprising instructions stored thereon, which when executed by one or more processors, cause the one or more processors to perform operations for distributing a service, the operations comprising:
  executing, by a service provider, a service deployment of the service to a client in a cloud environment that operates client software in addition to the service deployment, the cloud environment provided by the client, the service deployment provided by the service provider and separate from the client software executing in the cloud environment;
  receiving, by the service provider, privileges from the client to allow the service provider to access and operate the service in the cloud environment, the privileges providing access to the cloud environment separate from the client software executing in the cloud environment; and
  configuring the service deployment to monitor the client software, wherein the service deployment is partially isolated from other portions of the cloud environment.

* * * * *